United States Patent [19]

Bellos

[11] 4,303,780

[45] Dec. 1, 1981

[54] UREYLENES AND USES THEREOF

[75] Inventor: Thomas J. Bellos, Kirkwood, Mo.

[73] Assignee: Petrolite Corporation, St. Louis, Mo.

[21] Appl. No.: 124,998

[22] Filed: Feb. 26, 1980

[51] Int. Cl.$^3$ .............................................. C08G 71/02
[52] U.S. Cl. .................... 528/367; 528/68; 564/50; 564/59; 210/705
[58] Field of Search ............. 528/367, 68; 260/553 R; 564/59, 50

[56] References Cited

U.S. PATENT DOCUMENTS

| | | | |
|---|---|---|---|
| 2,155,328 | 4/1930 | Paquin .................................. | 528/367 |
| 3,324,176 | 6/1967 | Kirschnek et al. .............. | 528/367 X |
| 3,617,440 | 11/1971 | Strother ........................... | 528/367 X |
| 4,154,724 | 5/1979 | Schulze .................................. | 528/68 |
| 4,178,426 | 12/1979 | Waddill ............................... | 528/111 |
| 4,178,427 | 12/1979 | Waddill et al. ..................... | 528/124 |

Primary Examiner—Earl A. Nielsen
Attorney, Agent, or Firm—Sidney B. Ring; Hyman F. Glass

[57] ABSTRACT

This invention relates to ureylene prepared by reacting an oxyalkylated polyamine with urea and to uses of such ureylene for example in removing oils, solids, and combinations thereof from aqueous systems, etc.

11 Claims, No Drawings

UREYLENES AND USES THEREOF

This invention relates to ureylenes prepared by reacting an oxyalkylated polyamine with urea; and to uses thereof, for example, in removing oils, solids and combinations thereof, etc., from aqueous systems.

Theoretically, when a polyamine reacts with urea the following reactions occur:

$$NH_2-R-NH_2 + NH_2-\overset{O}{\underset{\|}{C}}-NH_2 \xrightarrow[-NH_3]{\Delta T}$$

$$NH_2-R-NH\overset{O}{\underset{\|}{C}}NH_2 \xrightarrow[-NH_3]{\Delta T} \left[-R-NH-\overset{O}{\underset{\|}{C}}-NH-\right]_n$$

aminoalkylene ureas　　　polyalkylene ureas

Aminoalkylene urea and polyalkylene ureas are also called ureylenes.

Theoretically, when alcohol reacts with urea the following reaction occurs $$ROH + NH_2-\overset{O}{\underset{\|}{C}}-NH_2 \xrightarrow[-NH_3]{\Delta T} RO\overset{O}{\underset{\|}{C}}-NH_2$$

urethanes

I have now discovered that when oxyalkylated polyamines are reacted with urea, they yield products which have a wide variety of uses. In general, these compositions are ureylenes (i.e., aminoalkylene ureas and polyalkyleneureas) containing urethane groups. They may be linear, contain dangling groups, be crosslinked, or combinations thereof, etc.

Theoretically, where the polyamine is bifunctional, a linear polymer is formed; where the polyamine is polyfunctional a crosslinked polymer is formed; where a functional group reacts with a non-polymer such as urea, a dangling group is formed, etc.

Ideally stated, the reaction of the oxyalkylated amine may be stated $$\left[NH_2-R-NH_2\right]-(AO)_nH + NH_2\overset{O}{\underset{\|}{C}}NH_2 \xrightarrow[-NH_3]{\Delta T}$$

$$\left[NH_2-RNH\overset{O}{\underset{\|}{C}}-NH_2\right]-(AO)_nH \longrightarrow$$

$$\left[-R-NH\overset{O}{\underset{\|}{C}}-NH-\right]-(AO)_nH \xrightarrow[-NH_3]{\Delta T}$$

$$\left[-R-NH-\overset{O}{\underset{\|}{C}}-NH-\right]-(AO)_n\overset{O}{\underset{\|}{C}}NH_2$$

The $-(AO)_nH$ symbolically represents a nitrogen-bonded oxyalkyl group for example $-N-(CH_2CH_2O)_nH$.

A specific illustration is $$\left[-R-NH-\overset{O}{\underset{\|}{C}}-N-\right]\underset{CH_2CH_2OH}{|}$$

and as the urethane $$\left[-R-\underset{H}{\overset{}{N}}-\overset{O}{\underset{\|}{C}}-N-\right]\underset{CH_2CH_2O\overset{O}{\underset{\|}{C}}NH_2}{|}$$

The above representation is ideally presented with the understanding that various other reactions may occur.

The prime groups formed are (1) substituted ureas containing the following group $$-\underset{H}{\overset{}{N}}-\overset{O}{\underset{\|}{C}}-\underset{H}{\overset{}{N}}-$$

(2) biurets containing the following group $$-\underset{H}{\overset{}{N}}-\overset{O}{\underset{\|}{C}}-\underset{H}{\overset{}{N}}-\overset{O}{\underset{\|}{C}}-\underset{H}{\overset{}{N}}-$$

(3) triurets containing the following group $$-\underset{H}{\overset{}{N}}-\overset{O}{\underset{\|}{C}}-\underset{H}{\overset{}{N}}-\overset{O}{\underset{\|}{C}}-\underset{H}{\overset{}{N}}-\overset{O}{\underset{\|}{C}}-$$

(4) urethanes containing the following group $$-O\overset{O}{\underset{\|}{C}}-NH-$$

(5) and combinations thereof.

The polyamines of this invention are oxyalkylated with any suitable oxyalkylation agent. Oxyalkylation is too well known to go into great detail. Typical oxyalkylation agents include those compounds containing $$\overset{}{\underset{}{=}}C\overset{}{\underset{O}{\diagdown\diagup}}C\overset{}{\underset{}{=}}$$

units such as ethylene oxide, propylene oxide, butylene oxide, etc., alone or in combination, added as mixtures thereof, sequentially added to form "blocks," etc.

The ureylene reaction may be carried out over a wide temperature range provided the desired products are formed, for example from about 100° C. to 200° C., such as from about 115° to 185° C., but preferably from about 145° to 175° C.

The reaction time can vary widely depending on the particular reactants, the particular temperatures employed, the particular product desired, etc. Reaction time of about 6 to 15 hours, such as from about 8 to 12 hours, but preferably from about 7 to 10 hours.

The following are illustrative polyamines which can be employed in the invention.

The polyamines employed include those of the following formula:

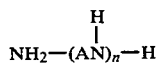

where n is for example 1-8 or greater, where A is a divalent radical, for example straight or branched $-(CH_2)_m-$, $-CH_2CH_2-$, $-\underset{\underset{}{CH_3}}{CH}-CH-$, $-CH_2\underset{\underset{}{CH_2}}{CH}-CH-$, etc.

and m is for example 2-10 or greater. These include the following:

NH₂CH₂CH₂NH₂

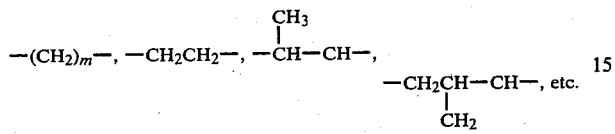
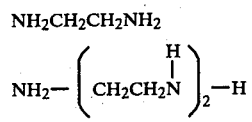
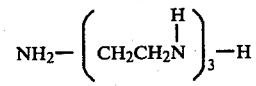
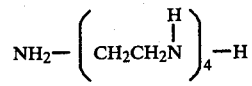
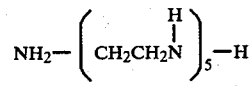
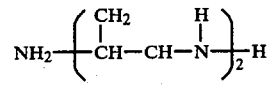
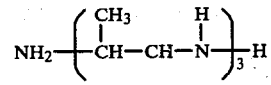

NH₂CH₂CH₂CH₂NH₂

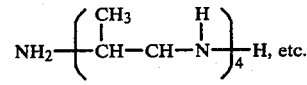
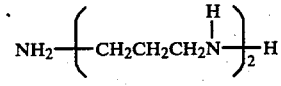
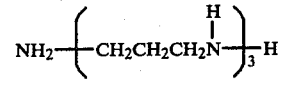

NH₂CH₂CH₂CH₂CH₂—CH₂CH₂NH₂

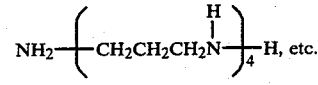
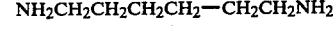

NH₂$(CH_2)_{5-10}$NH₂, etc.

Other examples include the following alkylated polyamines for example of the formula

where the R's are H or a substituted group, such as cycloalkyl, alkyl, alkenyl, alkynyl, aryl, etc. The preferable type is of the formula

(R is straight chain or branch.)

Examples include the following:

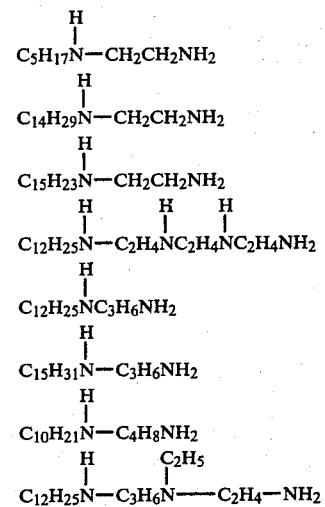

Other suitable amines are exemplified by:

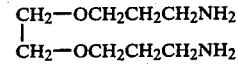

Aromatic polyamines can also be employed, for example:

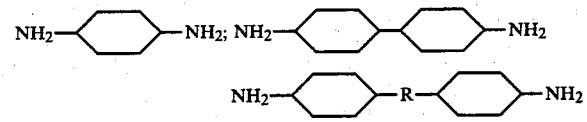

where R is O, S;

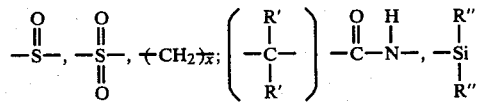

x = 1-4 where R' = H, Alkyl
where R'' is alkyl

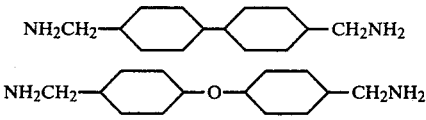

etc. or substituted derivatives thereof for example, alkyl, alkoxy, halo, etc. derivatives.

Thus, any polyamines capable of oxyalkylation, whether aliphatic, cyclo-aliphatic, aromatic, heterocyclic, etc., can be employed provided the oxyalkylated amine is capable of reacting with urea to form ureylenes.

A convenient method of determining the amount of alkylene oxide to be added to the polyamine is based on reactive nitrogen-bonded hydrogen, i.e.

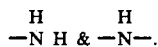

The replaceable hydrogen is encircled. Thus the primary amine group —$NH_2$ has two replaceable hydrogen and the secondary amino group

has one replaceable hydrogen. Thus, if an amine has

| primary amine | 10.8% |
|---|---|
| secondary amine | 3.3% |
| tertiary amine | 1.0% | the NH equivalent is calculated as follows:

$$\frac{14}{10.8 \times 2 \text{ (NH}_2\text{)} + 3.3 \times 1 \text{ (NH)}} \times 100 = \text{g of EtO/NH equivalent}$$

$$\frac{14}{[10.8 \times 2] + [3.3 \times 1]} \times 100 = 56.22 \text{ g/NH equivalent.}$$

Thus, 56.22 g of amine and 44 g of ethylene oxide are reacted. This is sufficient to theoretically react with all the nitrogen bonded hydrogens. Since tertiary amines have no reactive hydrogens, they are not calculated. Since reaction of alkylene oxide is random or statistical, some hydrogens will be more reactive than others or alkylene oxides will tend to react with themselves to form —$(CH_2CH_2O)_nH$, so that not all hydrogen may be fully reacted by just employing an equivalent amount of ethylene oxide and an excess may have to be employed to fully replace all hydrogens.

Thus, the amount of alkylene oxide added per —NH— equivalents may vary widely, such as from about 0.1 mole per NH equivalents to about 3.0 moles per NH, for example from about 0.25 to 2.5 per NH equivalents, for example from about 0.35 to 1.5 per NH equivalents, but preferably from about 0.5 to 0.8 moles per NH equivalents.

After the amine is oxyalkylated it is analyzed for primary, secondary, and tertiary amines prior to reaction with urea.

The amount of urea reacted per NH equivalents may vary widely such as from about 0.1 mole per NH equivalents to about 3.0 moles of urea per NH equivalents for example from about 0.25 to 2.5 moles of urea per NH equivalents, for example from about 0.35 to 1.5 moles of urea per NH equivalents, but preferably from about 0.5 to 0.8 moles per NH equivalents.

By employing the proper percentage of urea in preparing ureylene, one can control the solubility of the end product. For example in Example II, where the wgt. % of urea is below about 0.30 equivalent the product is too soluble and when the wgt. % is above about 0.90 equivalent, the product is too insoluble. Although urea outside this range are effective, it does not give optimum performance.

Prior to use as a flotation aid the ureylene is converted to salt form to make it more water soluble.

Ureylene.HX where HX is an acid.

Any suitable acid may be employed whether inorganic, organic, or combinations thereof.

The anion derived from the acid which may vary widely may be for example, halide (Cl, Br, I, F), chlorates, carboxylates, such as derived from aliphatic acids, acetates, proprionates, aromatic acids, for example, benzoates, salicilates, phthalates, etc., phosphate, sulfate, sulfonate, etc. The salt is employed at a pH on the acid side, i.e., below about pH 7, such as from about 6.9 to 1.0, for example, from about 6.9 to 3.0, but preferably from about 2.0 to 6.8, with an optimum of about 3.0 to 6.5

In practice the HCl salt is employed.

The compositions of this invention are employed as reagents in removing oils, solids, and combinations thereof from aqueous systems. They are particularly effective as such a reagent in flotation systems.

Removal of Oils and Solids from Aqueous Systems

In the present process, to remove oils, or solids, or combinations thereof, from aqueous systems, the reagent is introduced at any convenient point in the system, and it is mixed with the oils or solids in any desired manner, such as by being pumped or circulated through the system or by mechanical agitation such as paddles or by gas agitation. After mixing, the mixture of oils or solids and reagent is allowed to stand quiescent until the constituent phases of the emulsion separate. Settling times and optimum mixing times will, of course, vary with the nature of the oil or solid and the apparatus available. The operation, in its broadest concept, is simply the introduction of the reagent into the oils or solids, the mixing of the two to establish contact and promote coalescence, and, usually, the subsequent quiescent settling of the agitated mixture, to produce the aqueous and non-aqueous phases as stratified layers.

Agitation may be achieved in various ways. The piping system through which the oil- or solids-containing system is passed during processing may itself supply sufficient turbulence to achieve adequate mixing of reagent and system. Baffled pipe may be inserted in the flow sheet to provide agitation. Other devices such as perforated-chamber mixers, excelsior- or mineral- or gravel- or steel-shaving-packed tanks, beds of stones or gravel or minerals in open ducts or trenches may be employed beneficially to provide mixing. The introduction of a gas, such as natural gas or air, into a tank or pipe in which or through which the mixture of reagent and system is standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the system to be resolved, frequently has a favorable influence of totally unexpected magnitude. By incorporating the step of subjecting the chemicalized (i.e., containing the reagent) system to the action of air in a sub-aeration type flotation cell, a clear aqueous layer is sometimes obtained in a matter of seconds, without added quiescent settling and with approximately as much reagent. Natural gas was found to be as good a gaseous medium as was air, in this operation.

It should be distinctly understood that such aeration technique, while an important adjunct to the use of the present reagent, in some cases, is not as equivalent procedure. This may be proved by subjecting an un-chemicalized system to aeration for a period of minutes without detectable favorable effect. Addition of the reagent to such aerated system will produce resolution, promptly.

The details of the mechanical structures required to produce aeration suitable for the present purpose need not be given here. It is sufficient to state that any means capable of producing small gas bubbles within the body of the system is acceptable for use.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

Suitable aeration is sometimes obtainable by use of the principle of Elmore, U.S. Pat. No. 826,411. In that ore beneficiation process, an ore pulp was passed through a vacuum apparatus, the application of vacuum liberating very small gas bubbles from solution in the water of the pulp, to float the mineral. A more recent application of this same principle is found in the Door "Vacuator."

The manner of practicing the present invention using aeration is clear from the foregoing description.

The order in which the reagent and the aeration step are applied is relatively immaterial. Sometimes it is more convenient to chemicalize the system and subsequently to apply the aeration technique. In others, it may be more advantageous to produce a strongly frothing system and then introduce the reagent into such aerated system.

Any desired gas can be substituted for air. Other commonly suitable gases include natural gas, nitrogen, carbon dioxide, oxygen, etc., the gas being used essentially for its levitation effect. If any gas has some deleterious effect on any component of the system, it will be obviously be desirable to use instead some other gas which is inert under the conditions of use.

The amount of ureylene reagent used will vary depending on the particular ureylene, the particular system, etc. In general, the amount of ureylene employed in the system is at least about 0.5 ppm, such as from about 1.0 to 60 ppm, for example, from about 5 to 40 ppm, but preferably from about 3.0 to 30 ppm. Larger amounts may be used but there is generally no cost/performance reason for so doing.

WEMCO Depurator Flotation Machine is a flotation machine for removal of emulsified oily wastes and suspended solids from petroleum industry wastewater.

The WEMCO Depurator unit employs mechanically-induced air flotation to separate solids, oils, or organic materials from refinery or oil field effluent in larger volumes, in less space, and at lower cost than any other machine. It can clean large quantities of wastewater containing from 200 to 5,000 ppm of oil, depending on the type of oil and emulsion. In most applications, less than 10 ppm of oil remain after a four-minute cleaning cycle.

It is available in a variety of sizes to handle from 1,720 to 171,000 barrels of wastewater per day. Depurator machines can be installed at costs 15-40% less than other comparable flotation equipment. Maintenance costs are lower, too. The Depurator unit also requires at least 50% less space than comparable equipment for its volume capacity. Over 300 successful field installations to date.

WEMCO Depurator units are composed of four standard WEMCO flotation cells. Each cell is equipped with a motor-driven self-aerating rotor mechanism. As the rotor spins, it acts as a pump, forcing water through a disperser and creating a vacuum in the standpipe. The vacuum pulls gas into the standpipe and thoroughly mixes it with the wastewater. As the gas/water mixture travels through the disperser at high velocity, a shearing force is created, causing the gas to form minute bubbles. Oil particles and suspended solids attach to the gas bubbles as they rise to the surface. The oil and suspended solids gather in a dense froth on the surface, are removed from the cell by skimmer paddles and collected in external launders.

In the majority of applications, natural gas or nitrogen is used to form the bubbles. The absence of oxygen prevents the growth of harmful bacteria and also reduces downstream corrosion. A pressure of 0.50 to 1.0 ounce maintains a gas blanket between the liquid level and gas-tight cover. When air is used, it is induced by the Depurator machine at atmospheric pressure. Self-induced mechical air flotation eliminates need for auxiliary air compressors or blowers.

Processing is often improved with the air of a chemical injected into the water upstream from the float cell. These compounds break oil-in-water emulsions, gather suspended solids, and stabilize the air bubbles to promote froth flotation.

The Depurator machine consists of a self-supporting, all-steel skid-mounted tank, with integral float-collecting flumes and gas-tight covers. Tank interior is high-temperature epoxy coated for greatest corrosion resistance. Inspection doors are provided on both sides of the tank, plus a breather valve and pneumatic liquid level controller.

Each standpipe is equipped with gas intake ports beneath the gas-tight cover. A separate motor powers each rotor/disperser mechanism. Two ¼ horsepower gearmotors drive the skimmer assemblies. All motors are explosion-proof, 3 phase, 60 cycle, 230/460 volt.

The following are the major petroleum industry applications.

Oil Field Production Water

The Depurator machine wrings almost the final drops of oil from produced water. After initial treatment by gravity oil/water separators, such as free water knockouts, gun barrels, and skim tanks, oilfield water can be terminally cleaned to most community and company standads by the WEMCO Depurator machine. Depurator units will remove the emulsified oil left by preliminary water treatment which could prevent formation plugging and reduce pump efficiency when the water is to be reinjected for water flooding. For steam flooding, the Depurator unit is used ahead of boiler pretreatment equipment.

If the wastewater is to be disposed of by percolation ponds, or returned to existing waterways, the Depurator machine has consistently proven its ability to clean the water to local, state and federal standards.

Refinery Process Water

At the refinery, the Depurator wastewater treatment generally follows gravity oil-water separation. The wastewater includes process water from desalters, tank and water drawoffs, steam stripping condensate, pump gland cooling, barometric condenser, treating plant wash, caustic treatment, and loading facility washdown. It may also include storm run-off water.

The Depurator device is first choice for secondary wastewater treatment because, unlike gravity oil-water separators, it will break emulsions with appropriate chemical additives. More than a dozen successful installations are currently in refinery operation.

Petrochemical Wastewater

Wastewater created in the production of bulk chemicals derived from natural gas or petroleum is often distinguished from the usual oil refinery product by special characteristics. No single oil/water separation method has proven capable of handling all the compounds produced. The flotation process, as employed by the WEMCO Depurator machine, has proven to be the best wastewater treatment for many of these oils and suspended solids. Bench tests are recommended for each specific application.

Ballast Water

Rarely is it possible to discharge water directly into the bay or waterway from ballast water storage tanks. Depurator units take the water from the storage tank and make the precise oil-water separation necessary to meet government clean water standards. Depurator flotation machines, with appropriate chemical additives, can break emulsions and reduce oily waste content of ballast water to lower levels than any other flotation process.

The following examples are presented for purposes of illustration and not of limitation.

EXAMPLE IA

A sample of bis(hexamethylene) triamine (BHMT) is analyzed for its primary, secondary and tertiary amine content. The analysis yielded the following information:

| | |
|---|---|
| primary amine | 10.8% |
| secondary amine | 3.3% |
| tertiary amine | 1.0% |

The $NH_2$ equivalent was determined prior to the addition of oxide.

$NH_2$ equivalent $= (1400/10.8\%) = 129.6$ g/$NH_2$ eqt. based on primary amines only.

The amine is charged to a suitably outfitted reactor e.g., Chemco reactor model IPC-316-2AM, and heated to 70°–155° C. after which ethylene oxide is added. Oxide may be added to the extent that the all replaceable hydrogens have reacted with oxide moiety, e.g., as ideally represented by the following:

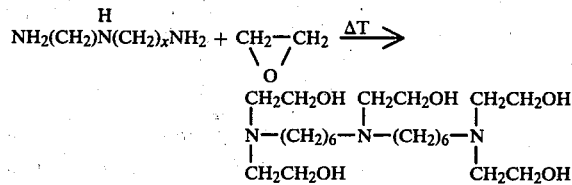

or any portion thereof. The oxide may also be added so that all amine species are used to calculate the NH eqt., e.g.,

EXAMPLE IB $$\frac{1400}{(10.8 \times 2) + (3.3)} = 56.22 \text{g/NH eqt.}$$

Therefore, to 56.22 g of amine (NH eqt) 44 g of ethylene oxide would be added to theoretically yield a molecule saturated with 2-hydroxyethanol groups. In the practice of this art the oxide is added based on the $NH_2$ equivalent of the amine since a fully saturated product would not yield the desired product.

EXAMPLE IC

Therefore, 129.6 g of amine are reacted with 40 g of alkylene oxide, e.g. EtO, yielding a partially oxide-modified amine containing random statistically scattered (e.g., 2-hydroxyl ethanol groups) about the molecular with substantial N-H groups available for the subsequent reaction with urea. e.g. (Product B below). In practice, the reaction of ethylene oxide with the polyamine is random and in order to prepare a product saturated with ethylene oxide would require much more than an equivalent of ethylene oxide per NH equivalent of amine. After modification with oxide the amine is analyzed for its primary, secondary and tertiary amine content since these values have changed. For example, an amine having the following analysis before modification with ethylene oxide

| Product A | |
|---|---|
| Primary amine % | 10.5% |
| Secondary amine % | 1.98% |
| Tertiary amine % | 2.02% |

The precursor to Example C was modified with ethylene oxide so that only a portion of the $NH_2$ groups are converted from primary amine to secondary and tertiary amine groups, e.g., Product A was modified in the fashion of Example C yield the following:

| Product B | |
|---|---|
| Primary amine % | 3.66% |
| Secondary amine % | 2.83% |
| Tertiary amine % | 4.34% |

This product was analyzed for its NH equivalent content based on primary and secondary amine content. This product was reacted with urea at several levels, e.g., 137.93 g (NH equivalent) Product B
30.03 g urea (one equivalent)

Product B and the urea were heated while stirring 135°–200° C. in a three neck reaction flask outfitted with a condenser Dean/Stark trap stirring and heating apparatus. The reaction set-up was preweighed before reaction. The reaction was continued for 5–12 hours after which the reaction set-up was weighed again to determine its weight loss due to the loss of ammonia and the decomposition products of urea. This product was a viscous wax-like substance mostly water insoluble. This product is diluted with appropriate solvents, then reacted with an acid from the group but not limited to, HCl, acetic, sulfuric which renders the product soluble to dispersable in water.

EXAMPLE II 137.93 g of Product B (1 NH equivalent)
21.02 g of urea (0.70 equivalent)
reacted in a similar fashion to Example I and formulated as follows:

100 g above reaction product
50 g water
40 g HCl (20° Be) 10 g 2-propanol yielded a mostly water soluble product useful as an aid to removal of crude oil and other particulate matter from oilfield production water in conjunction with a mechanical device, e.g., WEMCO Depurator, an air flotation apparatus and or dissolved air flotation device. Ideally, the product ranges in pH from 2.0–8.5.

FIELD EXAMPLE

At a location in West Texas a WEMCO Depurator is used to remove residual oil from oil field production water prior to its reinjection into the ground (secondary recovery). The WEMCO Depurator without the aid of a chemical additive of Example I and or II, exhibited the following efficiency towards removing the residual oil from the production water WEMCO inlet water (influent) 222 ppm
WEMCO outlet water (effluent) 176 ppm representing 21% efficiency. Adding 3–12 ppm of a chemical of Example II injected into the influent exhibited the following: 176 ppm influent, 12 ppm effluent. 93% efficiency. The chemical was removed and the effluent contaminant level increased and the efficiency of the oil removal dropped to 34%, 227 ppm influent, 148 ppm effluent. At a location in Wyoming a WEMCO unit was operating at 72% efficiency, 336 ppm influent, 93 ppm effluent, 3–5 ppm of a composition of Example II increased the efficiency 368 ppm influent, 22 ppm effluent, 94% efficiency.

These products have the ability to attract oil and aiding in its removal from the flotation apparatus. In addition to their apparent ability to attract oil, they also generate a froth that is beneficial towards the removal of the residual oil. Frothing action alone is not satisfactory. The solubility of the end reaction product is also important. Reaction products of Example II were the urea weight is below 20 g or above 65 g are respectively too soluble and too insoluble based on an NH equivalent of the modified amine but these products still exhibit activity. Therefore the compositions of this invention should have the desired solubility and chemical characteristics after the addition of acids to the desired pH so as to obtain the desired solubility.

The term "particulate matter" in the claims includes any matter in small unit form such as solids, liquids, combinations thereof, etc.

I claim:

1. A ureylene derived from first reacting a polyamine with about 0.5 to 0.8 mole of an oxyalkylating agent per NH equivalents of said polyamine, and thereafter reacting said oxyalkylated polyamine with urea.

2. The ureylene of claim 1 where the amount of urea added is about 0.5 to 0.8 mole per NH equivalents of said oxyalkylated polyamine.

3. The ureylene of claim 2 where said oxyalkylating agent is an alkylene oxide.

4. The ureylene of claim 3 where said alkylene oxide is ethylene oxide.

5. The ureylene of claim 4 where said ureylene is converted to salt form to make it more water soluble.

6. The ureylene of claim 5 where said conversion occurs by contact of the ureylene with HCl.

7. A process for obtaining ureylenes comprising: reacting a polyamine with about 0.5 to 0.8 mole of an oxyalkylating agent per NH equivalents of said polyamine, and thereafter reacting said oxyalkylated polyamine with urea.

8. The process of claim 7 where the amount of urea added is about 0.5 to 0.8 mole per NH equivalents of said oxyalkylated polyamine.

9. The process of claim 8 where said oxyalkylating agent is ethylene oxide.

10. The process of claim 9 where ureylene is converted to salt form to make it more water soluble.

11. The process of claim 10 where said conversion occurs by contact of said ureylene with HCl.

* * * * *